June 27, 1961    C. N. FANGMAN    2,990,226
PISTON
Filed March 5, 1958
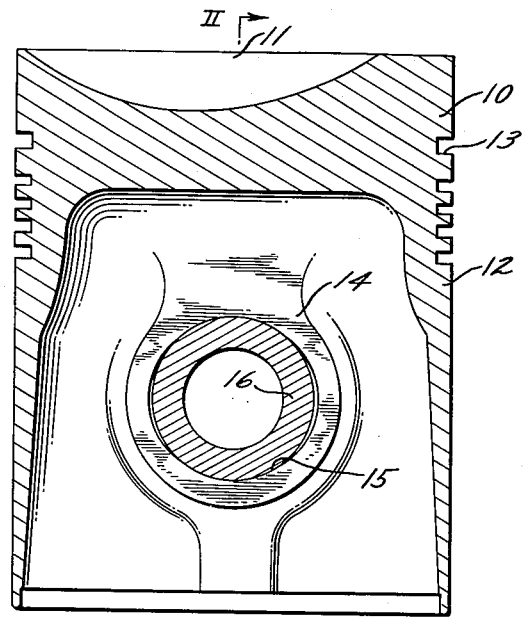
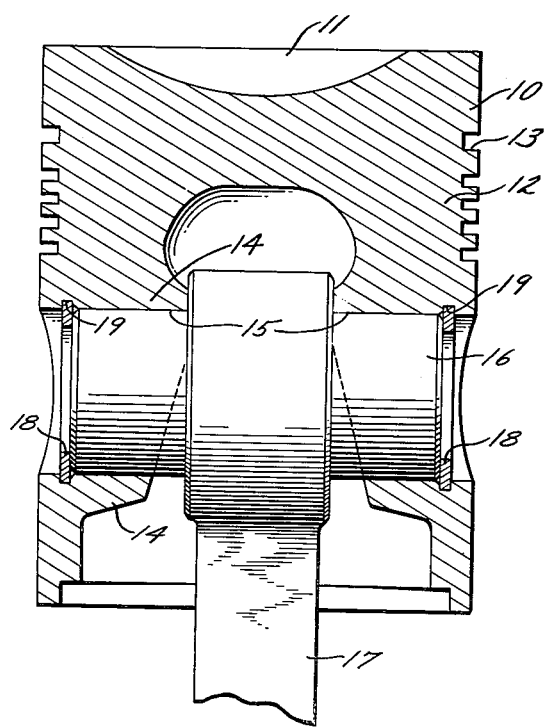
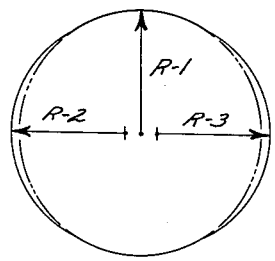
INVENTOR.
CHARLES N. FANGMAN
BY
Fryer and Johnson United States Patent Office
2,990,226
Patented June 27, 1961

2,990,226
PISTON
Charles N. Fangman, Peoria, Ill., assignor to Caterpillar Tractor Co., Peoria, Ill., a corporation of California
Filed Mar. 5, 1958, Ser. No. 719,301
4 Claims. (Cl. 309—19)

This invention relates to a piston construction and is particularly concerned with the connection between the piston and the piston pin.

A conventional piston for an internal combustion engine of the reciprocating type comprises a crown, or head portion, having a pair of bosses depending from the crown, the bosses being provided with co-axial bores extending one through each boss and referred to as the piston pin bore. The co-axial bores of the bosses receive a piston pin which is usually of hollow construction to reduce the weight of the reciprocating masses in the engine. A connecting rod is journalled at one of its ends about the piston pin between the bosses, and is connected to a crank-shaft at its other end so that reciprocation of the piston within an enclosing cylinder imparts rotation to the crank shaft. Usually the piston is provided with a cylindrical skirt portion depending from the crown and cast integrally with the crown and the pin bosses. The skirt is provided with a series of annular grooves to carry piston rings; the skirt also has the function of preventing excessive rocking of the piston about the longitudinal axis of the piston pin and tends to limit "piston slap" against the walls of the engine cylinder. The exterior surface of the skirt is usually provided with two apertures or bore openings which are co-axial with the bores of the pin bosses. Consequently, the skirt is divided into two major surface areas, one on each side of the longitudinal axis of the piston pin, which are usually unbroken or continuous and serve to limit the rocking of the piston about the longitudinal axis of the piston pin. In some piston constructions, the skirt is divided into two separate and distinct portions, one on each side of the longitudinal axis of the piston pin.

With the above type of piston construction and piston pin connection, the gas pressure within the combustion chamber of the engine has a tendency to compress or flatten the pin so that it expands outwardly in a direction perpendicular to the direction of the forces resulting from combustion of the fuel in the cylinder. The degree to which the pin will be compressed, or deformed, will depend upon the gas loads encountered in the engine in relation to the stiffness or rigidity of the piston pin. If a solid piston pin were used of sufficient rigidity, the deformation of the pin would be negligible. However, an undesirable addition would be made to the reciprocating masses. Since it is desirable from one point of view to use a hollow piston pin which has less rigidity than a solid pin, the combustion pressures in certain engines may reach a value sufficiently high to flatten or deform the piston pin to such an extent that the metal surrounding the pin bores of the pin bosses will be over-stressed and will ultimately crack.

It is an object of this invention to provide a piston with a piston pin connection which is able to withstand high gas pressures on the crown of the piston without over-stressing the pin bosses.

It is a further object of the invention to provide a piston with a piston pin connection in which a hollow pin is received in spaced bosses depending from the crown of the piston and the bosses have co-axial bores which are enlarged, or relieved, on both sides of the bores adjacent the unbroken skirt portions of the piston. Specifically, the invention comprises a piston and piston pin connection in which clearance for a running fit is provided between those portions of the piston pin and the piston pin bore which sustain the major part of the gas and inertia loads while additional clearance between the piston pin and the piston pin bore is provided throughout the major portions of the piston pin bore which are adjacent the unbroken skirt portions of the piston to permit the piston pin to flex under high gas loads without imposing through the pin bore any high force components perpendicular to the direction of movement of the piston.

In the drawings:

FIG. 1 is a central sectional view of a piston and pin embodying the present invention taken along the longitudinal axis of the piston and at a right angle to the axis of the piston pin.

FIG. 2 is a sectional view taken on line II—II of FIG. 1 and illustrating the upper end of a connecting rod, and FIG. 3 is an enlarged schematic view of the piston pin bore of FIG. 1 illustrating the relieved segments or enlargements along certain portions of the bore adjacent the skirt sides of the piston.

Referring to FIGS. 1 and 2 of the drawings, a conventional piston for an internal combustion engine of the reciprocating type is shown at 10 and comprises a crown, or head portion, 11 cast integrally with a depending cylindrical piston skirt 12. A plurality of ring grooves 13 are machined in the crown end of the skirt in the conventional manner and a pair of diametrically opposed pin bosses 14 depend from the crown and are cast integrally with the crown and the encircling skirt. Each of these bosses extend from the skirt about a third of the distance across the piston and they are provided with co-axial bores 15 to receive a piston pin 16; these bores 15 are hereinafter referred to as the piston pin bore. The length and diameter of the piston pin and the piston pin bore in the bosses are commensurate with the gas loads anticipated in the engine.

A connecting rod, the piston end of which is shown at 17, is journalled about the piston pin 16 and between the bosses; the other end of the connecting rod is journalled about a throw of a crankshaft (not shown) in a conventional manner. A pair of snap rings 18 may be received in annular grooves 19 in the piston pin bore to prevent endwise movement of the piston pin.

The piston pin bore 15 is formed by conventional drilling methods and then by reaming the bore with a cylindrical reamer. The reamer forms an internal cylindrical bearing surface on a radius indicated by R–1 illustrated in FIG. 3 which absorbs the gas and inertia loads in the working directions of the piston. The radius R–1 is of a dimension to provide a running fit between the piston pin 16 and the piston pin bore 15. As the fuel charge in the engine cylinder is ignited, the resulting combustion imposes a gas load upon the crown of the piston. In engines having a high compression ratio, this gas load may reach a very high value during periods of high engine performance. In piston and piston pin connections of conventional constructions which employ a hollow pin such as that shown at 16 in FIG. 1, the pin will tend to be compressed or deformed when these exceedingly high gas loads are encountered. The deformation of the pin will be in a direction perpendicular to the load carrying direction of the piston. Therefore, as the piston is loaded by gas pressure, the piston pin becomes elliptical in shape with the major axis of the ellipse being normal to the longitudinal axis of the piston. In conventional piston and piston pin connections, a running fit is usually provided between the piston pin bore and the full circumference of the piston pin. Consequently, when the piston pin is deformed to an elliptical shape, force components normal to the load carrying direction of the piston tend to stress the piston around the bore. If sufficient deformation occurs, the piston will be over-stressed and will ultimately crack. Oftentimes, the crack will generate parallel to the longitudinal axis of the piston until the piston is cracked into two separate pieces.

To reduce those force components in the piston pin bore which are perpendicular to the load carrying direction of the piston, the present invention provides clearance for the piston pin along the major portions of the piston pin which expand in a direction normal to the load carrying plane of the piston. As shown in FIG. 3 of the drawings, this additional clearance is provided throughout the major portion of the piston pin bore which is adjacent the unbroken or continuous portions of the piston skirt. This clearance may be provided by using a boring bar eccentric to the position of the reamer used to generate the bore having the radius R–1 and may be of a radius indicated by R–2. The opposite side of the piston pin bore may be enlarged, or relieved, by using the same boring bar offset from the center of the main bore in the opposite direction to generate a surface described by the radius R–3.

It is not necessary that this additional clearance be provided by using a cutter which generates an arcuate surface; this enlargement or relief of the bore can be made by using a broach of any acceptable profile to remove a sufficient amount of metal along the sides of the pin bore adjacent the unbroken portions of the piston skirt so that additional clearance is provided to permit the piston pin to be deformed to an elliptical shape. Depending upon the additional clearance provided as well as the length of the arc through which the pin bore is enlarged, the force components in the pin bore which are perpendicular to the load carrying direction of the piston are materially reduced or eliminated. Therefore, by providing a piston and piston pin connection which has a running fit between those portions of the piston pin and the piston pin bore which sustain the major part of the gas and inertia loads while providing additional clearance between the pin and the pin bore throughout the major portions of the pin bore which is adjacent the unbroken portions of the piston skirt, the piston pin is permitted to flex under high gas loads without imposing in the pin bore undesirable force components which would tend to over-stress and ultimately crack the piston.

The depth of the additional clearance should be commensurate with the dimensional changes anticipated in the piston pin while the piston is carrying a high gas load. It has been determined by experiment that the length of the relieved portions of the pin bore should extend at least 90° on each side of the pin bore adjacent the unbroken skirt portions of the piston. There is a practical limit to the length of these arcs of relief, since an excessive length would remove so much of the bearing area in the piston pin bore that the piston and pin connection could not sustain the gas and inertia loads encountered.

I claim:

1. In a piston for an internal combustion engine of the reciprocating type having a crown, a pair of spaced piston pin bosses depending therefrom and a skirt portion cast integrally with the crown and the bosses, co-axial bores extending through the pin bosses and the piston skirt to form a piston pin bore, said bore being cylindrical except for relieved segments throughout its length along the sides of the bore adjacent the unbroken portions of the piston skirt.

2. In a piston for an internal combustion engine of the reciprocating type comprising a piston crown, a pair of spaced piston pin bosses and a piston skirt cast integrally with the crown and the bosses, said skirt being provided with a plurality of annular grooves and divided into separate portions below said grooves, co-axial aligned bores extending through the pin bosses to form a piston pin bore, said bore being cylindrical except for relieved segments which are enlarged throughout its length along the sides of the bore adjacent the skirt portions below the ring grooves.

3. In a piston having a crown, a skirt portion, and a pair of spaced bosses provided with co-axial bores to form a pin bore, a connection between the piston and a piston pin received in the pin bore in which clearance for a running fit between the piston pin and the pin bore is provided on the crown side of the connection as well as on that side of the connection opposite the crown and clearance in excess of a running fit between the said pin and bore is provided on both of the skirt sides of the connection throughout the length of the bore.

4. In a piston having a crown, a skirt portion, and a pair of spaced bosses provided with co-axial bores to form a pin bore, a connection between the piston and a piston pin received in the pin bore in which clearance in excess of a running fit between the piston pin and the pin bore is provided on both of the skirt sides of the connection throughout the length of the connection and along an arc of at least 90° on each skirt side of the connection and a running fit is maintained at the crown side and the side opposed thereto.

References Cited in the file of this patent

UNITED STATES PATENTS

| | | |
|---|---|---|
| 1,061,922 | Patrick | May 13, 1913 |
| 1,102,188 | Dyer et al. | June 30, 1914 |
| 1,699,921 | Rindsberg | Jan. 22, 1929 |
| 1,789,089 | Tobler | Jan. 13, 1931 |
| 1,923,717 | Frelin | Aug. 22, 1933 |
| 2,387,634 | Anderson | Nov. 23, 1945 |
| 2,388,363 | Moore | Nov. 6, 1945 |

FOREIGN PATENTS

| | | |
|---|---|---|
| 175,415 | Austria | July 10, 1953 |